United States Patent

Farrugia et al.

(10) Patent No.: US 6,780,560 B2
(45) Date of Patent: Aug. 24, 2004

(54) TONER PROCESSES

(75) Inventors: Valerie M. Farrugia, Oakville (CA); Guerino G. Sacripante, Oakville (CA)

(73) Assignee: Xerox Corporation, Stamford, CT (US)

( * ) Notice: Subject to any disclaimer, the term of this patent is extended or adjusted under 35 U.S.C. 154(b) by 65 days.

(21) Appl. No.: 10/354,245

(22) Filed: Jan. 29, 2003

(65) Prior Publication Data

US 2004/0146798 A1 Jul. 29, 2004

(51) Int. Cl.⁷ .................................................. G03G 5/00
(52) U.S. Cl. .............................. 430/137.14; 430/108.2
(58) Field of Search .......................... 430/137.14, 108.2

(56) References Cited

U.S. PATENT DOCUMENTS

| | | | |
|---|---|---|---|
| 4,558,108 A | 12/1985 | Alexandru et al. | 526/340 |
| 4,797,339 A | 1/1989 | Maruyama et al. | 430/109 |
| 4,983,488 A | 1/1991 | Tan et al. | 430/137 |
| 4,996,127 A | 2/1991 | Hasegawa et al. | 430/109 |
| 5,278,020 A | 1/1994 | Grushkin et al. | 430/137 |
| 5,290,654 A | 3/1994 | Sacripante et al. | 430/137 |
| 5,308,734 A | 5/1994 | Sacripante et al. | 430/137 |
| 5,858,601 A | 1/1999 | Ong et al. | 435/137 |
| 5,863,698 A | 1/1999 | Patel et al. | 430/137 |
| 5,925,488 A | 7/1999 | Patel et al. | 430/137 |
| 5,977,210 A | 11/1999 | Patel et al. | 523/161 |
| 6,140,003 A | 10/2000 | Sacripante et al. | 430/110 |
| 6,143,457 A * | 11/2000 | Carlini et al. | 430/108.2 |

\* cited by examiner

*Primary Examiner*—Mark A. Chapman
(74) *Attorney, Agent, or Firm*—E. O. Palazzo

(57) ABSTRACT

A process involving, for example, the admixing of an emulsion latex, a colorant, and a tetra-alkylated quaternary ammonium halide salt complexing agent; and thereafter, heating in sequence about below the Tg of a resin contained in the latex and then heating about above the Tg glass transition temperature of a resin contained in the latex.

29 Claims, No Drawings

TONER PROCESSES

BACKGROUND

The present invention is generally directed to toner processes, and more specifically, to aggregation and coalescence processes for the preparation of toner compositions where a cationic charge control agent (CCA) is added as a coagulant during the aggregation process. The CCA coagulant type molecules can be large organic tetra-alkylated quaternary ammonium halide salts such as dimethyldioctadecyl-ammonium (DMDODA) bromide or chloride. More specifically, the present invention is directed to toner compositions and processes thereof, wherein the toner core and exterior are rendered more hydrophobic by the CCA coagulant quaternary ammonium salts thereby, for example, enhancing the surface charging performance of the toner particles enabling high triboelectric charge levels at 20 percent RH (Relative Humidity), and 80 percent RH of from about −30 to about −100 microcoulombs per gram, and about −20 to about −40 microcoulombs per gram, respectively; and a low relative humidity sensitivity, such as from about 1.1 to about 3.6. In embodiments, the present invention is directed to the economical chemical in situ preparation of toners without the utilization of the known pulverization and/or classification methods, and wherein in embodiments toner compositions with a volume average diameter of from about 1 to about 25, and more specifically, from 1 to about 10 microns, and narrow GSD of, for example, from about 1.14 to about 1.25 as measured on the Coulter Counter can be obtained. The resulting toners can be selected for known electrophotographic imaging, digital, printing processes, including color processes, and lithography.

In further embodiments, the present invention is directed to a substantially free, or reduced surfactant process, and wherein the colorant dispersion contains a surfactant comprised of forming a latex of a polyester, such as a sodium sulfonated polyester resin in water, mixing the latex with a colorant, especially a pigment dispersion containing a coagulating organic complexing agent, such as a tetra-alkylated quaternary ammonium halide salt, and thereafter, heating the resulting mixture to primarily enable the generation of toner aggregates and coalesced toner particles. The polyester resin selected more specifically contains sulfonated groups thereby rendering them dissipatable, that is, the resin is formed from spontaneous emulsions in water without the use of organic solvents. The process of the present invention can be considered a substantially surfactant free chemical method wherein resins, such as sulfopolyester particles are aggregated and coalesced with organic complexing agents in the presence of a colorant dispersion by heating, and wherein during the heating no surfactants are utilized. Heating the mixture at temperatures of from about 45° C. to about 55° C. generates toner size particles with, for example, an average particle volume diameter of from about 1 to about 25, and more specifically, 2 to about 10 microns. It is believed that during the heating the components of the sulfonated polyester latex and the colorant dispersion aggregate fuse together to form composite toner particles. Additionally, it is believed that the complex agents, such as tetra-alkylated quaternary ammonium halide salts, cause the sulfonated polyester latex and colorant to aggregate and coalesce into a toner composite. More specifically, it is believed, while not desired to be limited by theory, that the polyester colloidal particles are destabilized by adding a dilute solution of positively charged tetra-alkylated quaternary ammonium halide salts which are capable of adsorbing onto the negative sulfonated moieties protruding out of the colloidal particles, and therefore, nullifying the repulsive forces on the colloidal particle surfaces. Also, in embodiments thereof, the present invention is directed to an in situ process comprised of first dispersing a colorant like a pigment, such as a cyan, magenta, yellow, red, orange, yellow, such as HELIOGEN BLUE™ or HOSTAPERM PINK™, reference the Color Index, in an aqueous mixture utilizing a high shearing device, such as a Brinkmann Polytron, microfluidizer or sonicator, thereafter shearing this mixture with a latex of suspended polyester resin particles, and which particles are more specifically, for example, of a size ranging from about 5 to about 500, and more specifically, 10 to about 250 nanometers in volume average diameter, as measured by the Brookhaven nanosizer. Thereafter, the resulting mixture is contacted with an organic complexing agent, and heated with stirring for a suitable time period of, for example, from about 1 to about 8 hours, and which heating is, for example, from about 40° C. to about 60° C., and more specifically, from about 45° C. to about 55° C., thereby resulting in the aggregation and simultaneous coalescence of the resin particles with the colorant, and permitting the formation of particles ranging in size of from about 0.5 micron to about 20 microns, and more specifically, from about 2 to about 10 microns in average diameter size as measured by the Coulter Counter (Microsizer II). The size of the coalesced particles and their distribution can be controlled by, for example, the amount of organic complexing agent selected and by the temperature of heating, and wherein the speed at which toner size particles are formed can also be controlled by the quantity of tetra-alkylated quaternary ammonium halide salt complexing agent used, and by the temperature. The particles obtained after heating can be subjected to washing with, for example, water to remove the residual organic complexing agent and then drying, whereby toner particles comprised of resin and colorant can be of various particle size diameters such as from 1 to about 25, and more specifically, about 12 microns in volume average particle diameter. The aforementioned toners are especially useful for the development of colored images with excellent line and solid resolution, and wherein substantially no background deposits are present.

FURTHER BACKGROUND AND REFERENCES

In reprographic technologies, such as xerographic and ionographic devices, toners with volume average diameter particle sizes of from about 9 microns to about 20 microns are effectively utilized. Moreover, in xerographic technologies, such as the high volume Xerox Corporation 5090 copier-duplicator, high resolution characteristics and low image noise are highly desired, and can be attained utilizing the small sized toners of the present invention with, for example, a volume average particle diameter of from about 2 to about 11 microns, and more specifically, less than about 7 microns, and with a narrow geometric size distribution (GSD) of from about 1.16 to about 1.3. Additionally, in xerographic systems wherein process color is utilized, such as pictorial color applications, small particle size colored toners, more specifically of from about 3 to about 9 microns, are desired to avoid paper curling. Also, it is preferable to select small toner particle sizes, such as from about 1 to about 7 microns, and with higher colorant loading, such as from about 5 to about 12 percent by weight of toner, such that the mass of toner layers deposited onto paper is reduced to obtain the same quality of image and resulting in a thinner plastic toner layer on paper after fusing, thereby minimizing or avoiding paper curling. Toners prepared in accordance with the present invention enable in embodiments the use of lower image fusing temperatures, such as from about 120° C. to about 150° C., thereby avoiding or minimizing paper curl. Lower fusing temperatures minimize the loss of moisture from paper, thereby reducing or eliminating paper curl. Furthermore, in process color applications, and especially in pictorial color applications, toner to paper gloss matching is desirable. Gloss matching is referred to as matching the gloss of the toner image to the gloss of the paper. For example, when a low gloss image of, more specifically, from about 1 to about 30 gloss is desired, low gloss paper is utilized, such as from about 1 to about 30 gloss units as measured by the Gardner Gloss metering unit, and which after image formation with small particle size toners, more specifically of from about 3 to about 5 microns, and fixing thereafter, results in a low gloss toner image of from about 1 to about 30 gloss units as measured by the Gardner Gloss metering unit. Alternatively, when higher image gloss is desired, such as from about 30 to about 60 gloss units as measured by the Gardner Gloss metering unit, higher gloss paper is utilized, such as from about 30 to about 60 gloss units, and which after image formation with small particle size toners of the present invention of more specifically from about 3 to about 5 microns, and fixing thereafter results in a higher gloss toner image of from about 30 to about 60 gloss units as measured by the Gardner Gloss metering unit. The aforementioned toner to paper matching can be attained with small particle size toners, such as less than 7 microns, and more specifically, less than 5 microns, such as from about 1 to about 4 microns, whereby the pile height of the toner layer or layers is considered low and acceptable.

Numerous processes are known for the preparation of toners, such as, for example, conventional polyester processes wherein a resin is melt kneaded or extruded with a pigment, micronized and pulverized to provide toner particles with a volume average particle diameter of from about 9 microns to about 20 microns and with broad geometric size distribution of from about 1.26 to about 1.5. In these processes, it is usually necessary to subject the aforementioned toners to a classification procedure such that the geometric size distribution of from about 1.2 to about 1.4 is attained. Also, in the aforementioned conventional process, low toner yields after classifications may be obtained. Generally, during the preparation of toners with average particle size diameters of from about 11 microns to about 15 microns, toner yields range from about 70 percent to about 85 percent after classification. Additionally, during the preparation of smaller sized toners with particle sizes of from about 7 microns to about 11 microns, lower toner yields can be obtained after classification, such as from about 50 percent to about 70 percent. With the processes of the present invention in embodiments, small average particle sizes of, for example, from about 3 microns to about 9 microns, and more specifically, 5 microns are attained without resorting to classification processes, and wherein narrow geometric size distributions are attained, such as from about 1.16 to about 1.30, and more specifically, from about 1.16 to about 1.25. High toner yields are also attained such as from about 90 percent to about 98 percent in embodiments of the present invention. In addition, by the toner particle preparation process of the present invention in embodiments, small particle size toners of from about 3 microns to about 7 microns can be economically prepared in high yields, such as from about 90 percent to about 98 percent by weight based on the weight of all the toner ingredients, such as toner resin and colorant.

There is illustrated in U.S. Pat. No. 4,996,127, the disclosure of which is totally incorporated herein by reference, a toner of associated particles of secondary particles comprising primary particles of a polymer having acidic or basic polar groups and a coloring agent. The polymers selected for the toners of the '127 patent can be prepared by an emulsion polymerization method, see for example columns 4 and 5 of this patent. In column 7 of this '127 patent, it is indicated that the toner can be prepared by mixing the required amount of coloring agent and optional charge additive with an emulsion of the polymer having an acidic or basic polar group obtained by emulsion polymerization. In U.S. Pat. No. 4,983,488, the disclosure of which is totally incorporated herein by reference, there is disclosed a process for the preparation of toners by the polymerization of a polymerizable monomer dispersed by emulsification in the presence of a colorant and/or a magnetic powder to prepare a principal resin component and then effecting coagulation of the resulting polymerization liquid in such a manner that the particles in the liquid after coagulation have diameters suitable for a toner. It is indicated in column 9 of this patent that coagulated particles of 1 to 100, and particularly 3 to 70, are obtained. The disadvantage, for example, of poor GSD requires classification resulting in low toner yields, reference for example U.S. Pat. No. 4,797,339, the disclosure of which is totally incorporated herein by reference, wherein there is disclosed a process for the preparation of toners by resin emulsion polymerization, wherein similar to the '127 patent certain polar resins are selected, and U.S. Pat. No. 4,558,108, the disclosure of which is totally incorporated herein by reference, wherein there is disclosed a process for the preparation of a copolymer of styrene and butadiene by specific suspension polymerization processes.

In U.S. Pat. No. 5,290,654, the disclosure of which is totally incorporated herein by reference, there is illustrated a process for the preparation of toners comprised of dispersing a polymer solution comprised of an organic solvent and a polyester, and homogenizing and heating the mixture to remove the solvent and thereby form toner composites.

Emulsion/aggregation/coalescing processes for the preparation of toners are illustrated in a number of Xerox patents, the disclosures of which are totally incorporated herein by reference, such as U.S. Pat. Nos. 5,290,654, 5,278,020, 5,308,734, 5,370,963, 5,344,738, 5,403,693, 5,418,108, 5,364,729, and 5,346,797. Also of interest may be U.S. Pat. Nos. 5,348,832; 5,405,728; 5,366,841; 5,496,676; 5,527,658; 5,585,215; 5,650,255; 5,650,256; 5,501,935; 5,723,253; 5,744,520; 5,763,133; 5,766,818; 5,747,215; 5,827,633; 5,853,944; 5,804,349; 5,840,462; 5,869,215; 5,910,387; 5,919,595; 5,916,725; 5,902,710; 5,863,698, 5,925,488; 5,977,210 and 5,858,601.

The appropriate components, processes and the like of the above Xerox patents may be selected for the present invention in embodiments thereof.

SUMMARY

It is a feature of the present invention to provide toner processes with many of the advantages illustrated herein.

In another feature of the present invention there are provided simple and economical processes for the preparation of black and colored toner compositions with, for example, excellent colorant dispersion and narrow GSD.

In another feature of the present invention there are provided simple and economical in situ reduced surfactant processes for black and colored toner compositions by an emulsion aggregation process, and wherein a sulfonated polyester is selected as the resin, reference U.S. Pat. No. 6,140,003, the disclosure of which is totally incorporated herein by reference.

In a further feature of the present invention there is provided a process for the preparation of sulfonated polyester containing toner compositions with an average particle volume diameter of from about 1 to about 20 microns, and more specifically, from about 1 to about 7 microns, in volume average diameter, and with a narrow GSD of from about 1.15 to about 1.35, and more specifically, from about 1.14 to about 1.22 as measured by a Coulter Counter.

Also, in a further feature of the present invention there is provided a process for the preparation of toner compositions with certain effective particle sizes by controlling the temperature of the aggregation/coalescence, which process comprises stirring and heating at a suitable aggregation/coalescence temperature.

Additionally, further features of the present invention relate to a process for the preparation of toners with a particle size distribution which can be improved from about 1.4 to about 1.16 as measured by the Coulter Counter by increasing the temperature of aggregation/coalescence from about 25° C. to about 60° C., and more specifically, from about 45° C. to about 55° C.; a process that is rapid, for example, the aggregation/coalescence time can be reduced to from about 1 to about 3 hours by increasing the temperature from room, about 25° C., (RT) to about 50° C. to about 60° C., and wherein the process consumes from about 1 to about 8 hours; an economical process for the preparation of toner compositions which after fixing to paper substrates results in images with a gloss of from 20 GGU (Gardner Gloss Units) up to 70 GGU as measured by Gardner Gloss meter matching of toner and paper; processes for providing composite toners of a polymeric resin and pigment and optional charge control agent in high yields of from about 90 percent to about 100 percent by weight of toner without resorting to classification and wherein surfactants are avoided; and processes for dissipating a polar charged sodium sulfonated polyester resin in water at about 10° C. to about 25° C. above the Tg of the polyester to form an emulsion latex, followed by mixing with pigment and tetra-alkylated quaternary ammonium halide salt complexing agent, and thereafter heating the mixture to from about 30° C. to about 65° C., and more specifically, from about 45° C. to about 55° C. to effect aggregation/coalescence of the emulsion particles and pigment to form coalesced toner particles of resin and pigment of a diameter, for example, of from 1 to about 10 microns, and more specifically, from 3 to about 7 microns; toner compositions with low fusing temperatures of from about 110° C. to about 150° C. and with excellent blocking characteristics at from about 50° C. to about 60° C.; simple and economical chemical processes for the preparation of toner compositions with, for example, a polyester core with incorporated colorant and quaternary tetra-alkylated ammonium salts; toner particles coagulated with charge control agents and wherein there results toners with enhanced charging performance characteristics such as triboelectric charging levels at both low and high humidity zones (20 percent and 80 percent relative humidity, respectively), minimized RH sensitivity, and narrow charge distributions determined by the half-width of the charge spectrograph; the use of tetra-alkylated quaternary ammonium halide salts as a coagulant, which substantially eliminates the crosslinking that is exhibited by a di-cation salt, and thereby resulting in toner exhibiting high gloss; and processes for the preparation of reduced surfactant, or substantially free surfactant latexes, thereby reducing or eliminating extensive washings.

Aspects of the present invention relate to a toner process comprising (i) admixing an emulsion latex, a colorant, and a tetra-alkylated quaternary ammonium halide salt complexing agent;

(ii) wherein the colorant contains from about 20 to about 50 percent of predispersed colorant in water and which colorant possesses a mean colorant size of from about 50 to about 150 nanometers;

(iii) heating the resulting mixture at a temperature of from about 45° C. to about 65° C. thereby causing aggregation and enabling coalescence, resulting in toner particles of from about 2 to about 25 microns in volume-average diameter; and optionally (iv) cooling the toner product mixture followed by isolation of the toner; a process comprising (i) admixing an emulsion latex, a colorant, and a tetra-alkylated quaternary ammonium halide salt complexing agent; and thereafter, heating in sequence about below the Tg of a resin contained in the latex and about above the Tg glass transition temperature of a resin contained in the latex; a process wherein the tetra-alkylated quaternary ammonium halide salt complexing agent is benzyldimethylstearyl ammonium chloride, dimethyldistearyl ammonium halide, acetate, phosphate, sulfate, or alkylsulfonate salts of tetra-alkylated ammonium compounds; a process wherein the particle size distribution of the aggregated particles formed in (iii) is about 1.40, decreasing to about 1.15 when the temperature is increased from room temperature, about 25° C. to about 55° C.; a process wherein the latex contains a polyester of poly(1,2-propylene-sodio 5-sulfoisophthalate), poly(neopentylene-sodio 5-sulfoisophthalate), poly(diethylene-sodio 5-sulfoisophthalate), copoly-(1,2-propylene-sodio 5-sulfoisophthalate)-copoly-(1,2-propylene-terephthalatephthalate), copoly-(1,2-propylene-diethylenesodio 5-sulfoisophthalate)-copoly-(1,2-propylene-diethylene-terephthalatephthalate), copoly-(ethylene-neopentylene-sodio 5-sulfoisophthalate)-copoly-(ethylene-neopentylene-terephthalate-phthalate), or copoly-(propoxylated bisphenol A)-copoly-(propoxylated bisphenol A-sodio 5-sulfoisophthalate); a process wherein the latex contains a polyester of poly(1,2-propylene-sodio 5-sulfoisophthalate), poly(neopentylene-sodio 5-sulfoisophthalate), poly(diethylene-sodio 5-sulfoisophthalate), copoly-(1,2-propylene-sodio 5-sulfoisophthalate)-copoly-(1,2-propylene-terephthalatephthalate), copoly-(1,2-propylene-diethylenesodio 5-sulfoisophthalate)-copoly-(1,2-propylene-diethylene-terephthalatephthalate), copoly-(ethylene-neopentylene-sodio 5-sulfoisophthalate)-copoly-(ethylene-neopentylene-terephthalatephthalate), or copoly-(propoxylated bisphenol A)-copoly-(propoxylated bisphenol A-sodio 5-sulfoisophthalate); a process wherein the colorant is carbon black, magnetite, cyan, yellow, magenta, or mixtures thereof; a process wherein there results isolated toner particles of from about 2 to about 15 microns in volume average diameter; a process wherein there is added to the surface product obtained, and which product is a toner metal salts, metal salts of fatty acids, silicas, metal oxides, or mixtures thereof, each in an amount of from about 0.1 to about 10 weight percent of the obtained toner; a process wherein the product obtained is a toner of from about 3 to about 20 microns in volume average diameter; a process wherein the first heating is from about 35° C. to about 65° C., and wherein the second heating is from about 40° C. to about 65° C. above the latex resin Tg; a surfactant free process for the preparation of toner comprising admixing an emulsion latex comprised of a sodio sulfonated polyester resin and heating the resin in water at a temperature of from about 15° C. to about 30° C. above the resin glass transition temperature with a colorant dispersion containing from about 20 to about 50 percent of predispersed colorant in water, followed by the addition of a tetra-alkylated quaternary ammonium halide salt complexing component; heating the resulting mixture at a temperature of from about 35° C. to about 65° C.; and (v) cooling; a process wherein there is prepared an emulsion latex comprised of the sodio sulfonated polyester resin particles by heating the resin in water, and wherein subsequent to cooling the toner is isolated, and then dried; a process wherein the isolated is by filtration and cooling is to about 25° C.; a process wherein there results a toner and wherein the toner is cooled to about 25° C., followed by washing and drying; a process wherein the complexing agent is selected in an amount of from about 1 to about 5 weight percent; a process wherein the latex contains a sodio sulfonated polyester resin of a size diameter of from about 10 to about 150 nanometers; a process wherein the toner is from about 3 to about 10 microns in volume average diameter, and the toner optionally possesses a geometric distribution of less than about, or equal to about 1.25; a process wherein the addition of the tetra-alkylated quaternary ammonium halide salt complexing agent provides for the aggregation and coalescence of the latex and colorant by primarily destabilizing the resin present in the latex, and wherein the resin is comprised of sulfonated polyester resin colloids and, which addition further provides for particle aggregation between the quaternary ammonium halide, colorant and resin; a process wherein the latex contains a sulfonated polyester resin destabilized by adding a solution of positively charged tetra-alkylated quaternary ammonium halide salts which are capable of adsorbing onto the negative sulfonated moieties protruding out of the resin; a surfactant free process for the preparation of toner comprising mixing an emulsion latex comprised of sodio sulfonated polyester resin particles and a colorant, followed by the addition of a tetra-alkylated quaternary ammonium halide salt complexing agent, and heating the resulting mixture to enable aggregation and coalescence of the resin particles and the colorant; a process comprising (i) preparing an emulsion latex comprised of sodio sulfonated polyester resin particles of from about 5 to about 300 nanometers in size diameter by heating the resin in water at a temperature of from about 65° C. to about 90° C.;

(ii) adding with shearing to the latex a colorant dispersion containing from about 20 to about 50 percent of a predispersed colorant in water and with a mean colorant size of from about 50 to about 150 nanometers, followed by the addition of a tetra-alkylated quaternary ammonium halide salt complexing agent;

(iii) heating the resulting mixture at a temperature of from about 45° C. to about 65° C. thereby causing aggregation and enabling coalescence, resulting in toner particles of from about 2 to about 25 microns in volume average diameter; and (iv) isolating the toner product; a process wherein the tetra-alkylated ammonium compounds contain from 1 to about 20 carbon atoms; a process wherein the alkyl is methyl, ethyl, propyl, n-butyl, sec-butyl, tert-butyl, n-pentyl, iso-pentyl, neo-pentyl, hexyl, heptyl, octyl, nonyl, decyl, undecyl, dodecyl, lauryl, tridecyl, tetradecyl or myristyl, pentadecyl, hexadecyl or cetyl, heptadecyl, octadecyl, stearyl, or nonadecyl; a process wherein the latex contains a sodio sulfonated polyester; a process wherein the agent is benzyldimethylstearyl ammonium chloride; a process wherein the agent is dimethyldistearyl ammonium chloride; a process wherein the agent is dimethyldioctadecyl ammonium chloride; a process wherein the agent is dimethyldioctadecyl ammonium chloride; processes for the preparation of toner compositions which comprise initially attaining or generating a colorant, such as a pigment dispersion by, for example, dispersing an aqueous mixture of a colorant, especially pigment or pigments, such as carbon black like REGAL 330® obtained from Cabot Corporation, phthalocyanine, quinacridone or RHODAMINE B™, and generally cyan, magenta, yellow, or mixtures thereof, by utilizing a high shearing device, such as a Brinkmann Polytron, thereafter shearing this mixture by utilizing a high shearing device, such as a Brinkmann Polytron, a sonicator or microfluidizer together with a suspended resin mixture comprised of a sulfonated polyester polymer component, adding a tetra-alkylated quaternary ammonium halide salt complexing agent, and subsequently heating to enable aggregation/coalescence; a process for the preparation of toner compositions with reduced surfactant amounts comprising (i) preparing an emulsion latex comprised of sodio sulfonated polyester resin particles of from about 5 to about 300 nanometers, and more specifically, about 10 to about 250 nanometers in diameter, and in an amount of from about 5 to about 40 weight percent by heating the resin in water at a temperature of from about 45° C. to about 80° C.;

(ii) adding a pigment dispersion containing about 20 to about 50 percent of the predispersed pigment in water, and with a mean pigment size of from about 50 to about 150 nanometers, to a latex mixture comprised of sulfonated polyester resin particles in water and which adding is with shearing, and followed by the addition of a tetra-alkylated quaternary ammonium halide salt complexing agent in an amount of from about 1 to about 5 weight percent in water;

(iii) heating the resulting mixture at a temperature of from about 35° C. to about 60° C., and more specifically, from 45° C. to about 55° C. thereby causing aggregation and coalescence resulting in toner particles of from about 4 to about 12 microns in size with a geometric distribution of less than about 1.3; and (iv) cooling the product mixture to about 25° C., followed by filtering and drying; a process for the preparation of toner comprising (i) preparing, or providing an emulsion latex comprised of sodio sulfonated polyester resin particles of from about 5 to about 500 nanometers and, more specifically, from 10 to about 250 nanometers in size diameter by heating the resin in water at a temperature of from about 65° C. to about 95° C.;

(ii) adding the colorant dispersion to the obtained latex mixture comprised of sulfonated polyester resin particles in water and which adding is with shearing, followed by the addition of an tetra-alkylated quaternary ammonium halide salt component in water;

(iii) heating the resulting mixture at a temperature of from about 35° C. to about 65° C., and more specifically, from about 45° C. to about 55° C. thereby causing aggregation and enabling coalescence resulting in toner particles of, for example, from about 4 to about 9 microns in volume average diameter; and optionally (iv) cooling the product mixture to about 25° C. followed by filtering and drying; a surfactant or substantially surfactant free process for the preparation of toner comprising (i) preparing an emulsion latex comprised of sodio sulfonated polyester resin particles of less than 0.1 micron in size by heating this resin in water at a temperature of from about 5° C. to about 35° C., and more specifically, from about 10° C. to about 20° C. above its glass transition temperature;

(ii) adding a colorant dispersion to the above generated latex mixture comprised of sulfonated polyester resin particles in water with shearing, and followed by the addition of a tetra-alkylated quaternary ammonium halide salt complexing component in an amount of from about 0.25 to about 5 weight percent in water;

(iii) heating the resulting mixture at a temperature of from about 35° C. to about 68° C., and more specifically, from about 45° C. to about 60° C. thereby causing aggregation and coalescence and resulting in toner particles of from about 4 to about 12 microns in size and optionally with a geometric distribution of less than about 1.3; and (iv) cooling the product mixture to about 25° C. followed by filtering and drying; and a process for the preparation of toner comprising (i) preparing an emulsion latex comprised of sodio sulfonated polyester resin particles by heating resin in water;

(ii) adding a pigment dispersion to the above generated latex mixture comprised of sulfonated polyester resin particles in water and which adding is with shearing, followed by the addition of an aqueous solution of either an alkaline earth metal (II) salt or a transition metal salt followed by the addition of a tetra-alkylated quaternary ammonium halide salt complexing agent; and (iii) heating the resulting mixture thereby causing aggregation and enabling coalescence.

In some instances, colorants, such as pigments, available in the wet cake form or concentrated form containing water, can be easily dispersed utilizing a homogenizer or stirring. In other embodiments, pigments are available in a dry form, whereby dispersion in water is more specifically effected by microfluidizing using, for example, a M-110 microfluidizer and passing the pigment dispersion from 1 to about 10 times through the chamber of the microfluidizer, or by sonication, such as using a Branson 700 sonicator.

An example of the resins selected is a sulfonated polyester, examples of which include those as illustrated in U.S. Pat. No. 6,140,003, the disclosure of which is totally incorporated herein by reference, such as a sodio sulfonated polyester, and more specifically, a polyester, such as poly(1,2-propylene-sodio 5-sulfoisophthalate), poly(neopentylene-sodio 5-sulfoisophthalate), poly(diethylene-sodio 5-sulfoisophthalate), copoly-(1,2-propylene-sodio 5-sulfoisophthalate)-copoly-(1,2-propylene-terephthalatephthalate), copoly-(1,2-propylene-diethylene-sodio 5-sulfoisophthalate)-copoly-(1,2-propylene-diethylene-terephthalate-phthalate), copoly-(ethylene-neopentylene-sodio 5-sulfoisophthalate)-copoly-(ethylene-neopentylene-terephthalate-phthalate), copoly-(propoxylated bisphenol A)-copoly-(propoxylated bisphenol A-sodio 5-sulfoisophthalate). The sulfonated polyesters may in embodiments be represented by the following

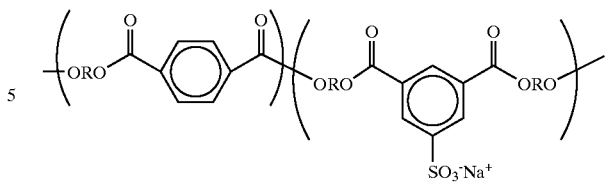

wherein R is a suitable substituent such as an alkylene of from about 2 to about 25 carbon atoms, such as ethylene, propylene, butylene, or oxyalkylene diethyleneoxide, and the like. The alkali sulfopolyester possesses, for example, a number average molecular weight ($M_n$) of from about 1,500 to about 50,000 grams per mole, and a weight average molecular weight ($M_w$) of from about 6,000 grams per mole to about 150,000 grams per mole as measured by gel permeation chromatography and using polystyrene as standards.

Various known colorants or pigments present in the toner in an effective amount of, for example, from about 1 to about 25 percent by weight of the toner, and more specifically, in an amount of from about 1 to about 15 weight percent, that can be selected include carbon black like REGAL 330®; magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP-608™; Magnox magnetites TMB-100™, or TMB-104™; and the like. As colored pigments, there can be selected cyan, magenta, yellow, red, green, brown, blue or mixtures thereof. Specific examples of pigments include phthalocyanine HELIOGEN BLUE L6900™, D6840™, D7080™, D7020™, PYLAM OIL BLUE™, PYLAM OIL YELLOW™, PIGMENT BLUE 1™ available from Paul Uhlich and Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E.I. DuPont de Nemours and Company, and the like. Generally, colored pigments that can be selected are cyan, magenta, or yellow pigments, and mixtures thereof. Examples of magenta materials that may be selected as pigments include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyan materials that may be used as pigments include copper tetra(octadecyl sulfonamido) phthalocyanine, x-copper phthalocyanine pigment listed in the Color Index as CI 74160, CI Pigment Blue, and Anthrathrene Blue, identified in the Color Index as CI 69810, Special Blue X-2137, and the like; while illustrative examples of yellow pigments that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK™, and cyan components may also be selected as pigments with the process of the present invention. The colorants, especially pigments selected, are present in various effective amounts, such as from about 1 weight percent to about 65 weight, and more specifically, from about 2 to about 12 percent of the toner. Colorants include dyes, pigments, mixtures thereof, mixtures of pigments, mixtures of dyes, and the like.

Examples of quaternary ammonium ion complexing agents, or components that in embodiments can also act as a toner charge enhancer, include tetra-alkylated ammonium salts such as benzyldimethylstearyl ammonium chloride, dimethyldistearyl (dimethyldioctadecyl or DMDODA) ammonium bromide or chloride, acetate, phosphate, sulfate, or alkylsulfonate salts of tetra-alkylated ammonium compounds with about $C_1$ to about $C_{20}$ alkyl substituents, such as methyl, ethyl, propyl, n-butyl, sec-butyl, tert-butyl, n-pentyl, iso-pentyl, neo-pentyl, hexyl, heptyl, octyl, nonyl, decyl, undecyl, dodecyl, or lauryl, tridecyl, tetradecyl or myristyl, pentadecyl, hexadecyl or cetyl, heptadecyl, octadecyl or stearyl, nonadecyl, eicosyl group, or mixtures thereof; and which salts may in embodiments contain aryl groups like phenyl, benzyl, 2-phenylethyl, naphthyl, anthracenyl, phenanthrenyl and the like. An effective concentration of the complexing agent is in embodiments, for example, from about 0.5 to about 10 percent by weight, and more specifically, from about 1 to about 5 percent by weight of the amount of the sulfonated polyester resin.

Examples of the alkali salts that can be selected to, for example, initiate the coalescence of the resin, such as the sodio sulfonated polyester colloid with a colorant to enable the initial growth of the core composite before the quaternary ammonium ion is added, are in embodiments selected from the akali (II) groups, such as beryllium chloride, beryllium bromide, beryllium iodide, beryllium acetate, beryllium sulfate, magnesium chloride, magnesium bromide, magnesium iodide, magnesium acetate, magnesium sulfate, calcium chloride, calcium bromide, calcium iodide, calcium acetate, calcium sulfate, strontium chloride, strontium bromide, strontium iodide, strontium acetate, strontium sulfate, barium chloride, barium bromide, barium iodide, or mixtures thereof, and the concentration thereof is, for example, from about 0.1 to about 10 weight percent of water.

Examples of transition metal salts that can be selected to, for example, initiate the coalescence of the resin, such as a sodio sulfonated polyester colloid with a colorant and to enable the initial growth of the core composite before the quaternary ammonium ion is added, are more specifically the halides such as chloride, bromide, iodide, or anions such as acetates, acetoacetates, sulfates of vanadium, niobium, tantalum, chromium, molybdenum, tungsten, manganese, iron, ruthenium, cobalt, nickel, copper, zinc, cadmium, silver; aluminum salts such as aluminum acetate, aluminum polyaluminum chloride, aluminum halides, mixture thereof and the like, and wherein the concentration thereof is optionally in the range of from about0.1 to about 10 weight percent by weight of water.

Surface additives that can be added to the toner compositions after washing or drying include, for example, metal salts, metal salts of fatty acids, colloidal silicas, mixtures thereof and the like, which additives are usually present in an amount of from about 0.1 to about 2 weight percent, reference U.S. Pat. Nos. 3,590,000; 3,720,617; 3,655,374 and 3,983,045, the disclosures of which are totally incorporated herein by reference. Preferred additives include zinc stearate and AEROSIL R972® available from Degussa in amounts of from about 0.1 to about 2 percent, which can be added during the aggregation process or blended into the formed toner product.

Developer compositions can be prepared by mixing the toners obtained with the processes of the present invention with known carrier particles, including coated carriers, such as steel, ferrites, and the like, reference U.S. Pat. Nos. 4,937,166 and 4,935,326, the disclosures of which are totally incorporated herein by reference, for example from about 2 percent toner concentration to about 8 percent toner concentration.

Imaging methods are also envisioned with the toners of the present invention, reference for example a number of the patents mentioned herein, and U.S. Pat. No. 4,265,660, the disclosure of which is totally incorporated herein by reference.

The following Examples are being submitted to further define various species of the present invention. These Examples are intended to be illustrative only and are not intended to limit the scope of the present invention. Also, parts and percentages are by weight unless otherwise indicated.

EXAMPLE I

Preparation of Sulfonated Polyesters

Moderately sulfonated polyesters prepared by known polycondensation processes were selected with a sufficient enough loading of sulfonate groups to afford a ready dissipation of the polymer in warm water (5° C. to 10° C.>Tg of the polyester) to submicron particles.

Preparation of Linear Moderately Sulfonated Polyester A

A linear sulfonated random copolyester resin comprised of, on a mol percent, basis approximately 0.47 of terephthalate, 0.030 of sodium sulfoisophthalate, 0.455 of neopentyl glycol, and 0.045 of diethylene glycol was prepared as follows. In a one liter Parr reactor equipped with a bottom drain valve, double turbine agitator, and distillation receiver with a cold water condenser were charged 388 grams of dimethylterephthalate, 44.55 grams of sodium dimethylsulfoisophthalate, 310.94 grams of neopentyl glycol (1 mole excess of glycol), 22.36 grams of diethylene glycol (1 mole excess of glycol), and 0.8 gram of butyltin hydroxide oxide as the catalyst. The reactor was then heated to 165° C. with stirring for 3 hours whereby 115 grams of distillate were collected in the distillation receiver, and which distillate was comprised of about 98 percent by volume of methanol and 2 percent by volume of neopentylglycol as measured by the ABBE refractometer available from American Optical Corporation. The mixture was then heated to 190° C. (degrees Centigrade) over a one hour period, after which the pressure was slowly reduced from atmospheric pressure to about 260 Torr over a one hour period, and then reduced to 5 Torr over a two hour period with the collection of approximately 122 grams of distillate in the distillation receiver, and which distillate was comprised of approximately 97 percent by volume of neopentylglycol and 3 percent by volume of methanol as measured by the ABBE refractometer. The pressure was then further reduced to about 1 Torr over a 30 minute period whereby an additional 16 grams of neopentylglycol were collected. The reactor was then purged with nitrogen to atmospheric pressure, and the polymer discharged through the bottom drain onto a container cooled with dry ice to yield 460 grams of the 3 mol percent sulfonated polyester resin, copoly (neopentylene-diethylene)terephthalate-copoly(sodium sulfoisophthalate dicarboxylate). The sulfonated polyester resin glass transition temperature was measured to be 54.7° C.

(onset) utilizing the 910 Differential Scanning Calorimeter available from E.I. DuPont operating at a heating rate of 10° C. per minute. The number average molecular weight was measured to be 2,560 grams per mole, and the weight average molecular weight was measured to be 3,790 grams per mole using tetrahydroturan as the solvent. A particle size of 31 nanometers (volume weighted) was measured using a Nicomp particle sizer.

Preparation of Linear Moderately Sulfonated Polyester B

A linear sulfonated random copolyester resin comprised of, on a mol percent, approximately 0.465 of terephthalate; 0.035 of sodium sulfoisophthalate, 0.475 of 1,2-propanediol, and 0.025 of diethylene glycol was prepared as follows. In a one liter Parr reactor equipped with a bottom drain valve, double turbine agitator, and distillation receiver with a cold water condenser were charged 388 grams of dimethylterephthalate, 44.55 grams of sodium dimethylsulfoisophthalate, 310.94 grams of 1,2-propanediol (1 mole excess of glycol), 22.36 grams of diethylene glycol (1 mole excess of glycol), and 0.8 gram of butyltin hydroxide oxide as the catalyst. The reactor was then heated to 165° C. with stirring for 3 hours whereby 115 grams of distillate were collected in the distillation receiver, and which distillate was comprised of about 98 percent by volume of methanol and 2 percent by volume of 1,2-propanediol as measured by the ABBE refractometer available from American Optical Corporation. The mixture was then heated to 190° C. over a one hour period, after which the pressure was slowly reduced from atmospheric pressure to about 260 Torr over a one hour period, and then reduced to 5 Torr over a two hour period with the collection of approximately 122 grams of distillate in the distillation receiver, and which distillate was comprised of approximately 97 percent by volume of 1,2-propanediol and 3 percent by volume of methanol as measured by the ABBE refractometer. The pressure was then further reduced to about 1 Torr over a 30 minute period whereby an additional 16 grams of 1,2-propanediol were collected. The reactor was then purged with nitrogen to atmospheric pressure, and the polymer discharged through the bottom drain onto a container cooled with dry ice to yield 460 grams of the 3.5 mol percent sulfonated polyester resin, copoly(1,2-propylene-diethylene)terephthalate-copoly (sodium sulfoisophthalate dicarboxylate). The sulfonated polyester resin glass transition temperature was measured to be 59.5° C. (onset) utilizing the 910 Differential Scanning Calorimeter available from E.I. DuPont operating at a heating rate of 10° C. per minute. The number average molecular weight was measured to be 3,250 grams per mole, and the weight average molecular weight was measured to be 5,290 grams per mole using tetrahydrofuran as the solvent. A particle size of 57 nanometers (volume weighted) was measured using a Nicomp particle sizer.

Preparation of Latex Stock Solutions

Submicron dispersions of the appropriate sulfonated polyester in distilled deionized water were prepared by first heating the water to about 10° C. to about 15° C. above the glass transition of the sulfonated polyester polymer and then slowly adding the polymer with stirring until it had fully dispersed. The latexes had a characteristic blue tinge and particle sizes in the range of from about 5 to about 150 nanometers, and typically in the range of, for example, about 20 to about 40 nanometers, as measured by the NiCOMP® particle sizer. Stock solutions were stable almost indefinitely. In general, 50 grams of sulfonated polyester were dissipated in 200 grams of water.

EXAMPLE II

A 6 Micron Cyan Control Toner Comprised of a Linear Sulfonated Polyester Core Resin and Pigment Blue 15:3™ Colorant A 1.5 kilogram colloidal solution containing 12 percent by weight of the above generated sodio sulfonated polyester resin was charged into a 5 gallon stainless steel reactor equipped with two P4 impellers and two baffles. To this was added 0.2 kilogram of a cyan pigment dispersion containing 47.4 percent by weight of Pigment Blue 15:3™ (available from Sun Chemicals), and the resulting mixture was heated to 57.5° C. with stirring at about 165 to about 180 revolutions per minute. To this heated mixture were then added dropwise 4.8 kilograms of an aqueous solution containing 5 percent by weight of zinc acetate dihydrate. The FIZA (fast initial zinc acetate addition) technique was used to add the solution in two stages. During FIZA stage 1, the zinc acetate solution was added at a rate of 0.60 kilogram/minute for 30 minutes. During FIZA stage 2, the flow rate of the solution was then decreased to 0.10 kilogram/minute. After a total of 4.8 kilograms of solution were added, the addition of the zinc acetate solution was stopped. The amount of zinc acetate added equaled approximately 16 percent of the total resin in the emulsion. After 1 hour of zinc acetate addition, the first sample was taken for particle size analysis. Stirring of the toner dispersion continued for 5 hours and 25 minutes until a particle size of about 6 µm was achieved. A sample (about 1 gram) of the reaction mixture was then retrieved from the reactor, and a particle size of 5.85 microns with a GSD of 1.19 was measured by the Coulter Counter. Full cooling was applied and particles were sieved at about 30° C. to about 35° C. through a 25 µm nylon filter bag. A portion of the toner slurry was washed two times with 500 grams of deionized water after the mother liquor removal, resuspended and freeze dried for 48 hours to provide the untreated parent toner (VF107B). The same toner slurry, which was left unwashed and in its mother liquor, was set aside for chemical surface treatment as more specifically described in Examples III to IV.

EXAMPLE III

Chemical Surface Treatment of a 6 Micron Cyan Toner with 1 Percent by Weight of Dimethyldioctadecylammonium Bromide (DMDODA-Br) (Before Mother Liquor Removal)

A 383 gram portion of the above generated cyan 6 micron toner slurry (in its mother liquor) and which contained 10.4 percent toner solids, or 40 grams of toner, was subjected to chemical surface treatment with dimethyldioctadecyl ammonium bromide (DMDODA-Br) at a concentration of 1 percent by weight of toner solids. The amount of DMDODA-Br salt for a 1 percent surface treatment was 0.4 gram, which was delivered as a 0.25 percent (wt/wt) solution of DMDODA-bromide in deionized water. The DMDODA-Br aqueous solution was prepared by mixing 0.4 gram of DMDODA-bromide into 160 millimeters of deionized water (DIW) and heating to 50° C. to aid dissolution. Once dissolved, the DMDODA solution was cooled to about 40° C. A sample of toner slurry containing 40 grams of 6 micron cyan toner solids in 343 grams of water was charged into a 1 liter resin kettle, and was mechanically stirred at 285 rpm and heated to 40° C. at a heating rate of about 0.75°

C./minute. Once at 40° C., the DMDODA-Br aqueous solution was added dropwise to the toner slurry at an approximate rate of 1 milliliter per minute. After complete addition, the mixture continued stirring for an extra two hours while cooling to ambient temperature. The cooled surface-treated toner slurry was first sieved through a 25 micron stainless steel screen (#500 mesh), and then filtered through a 3 micron hydrophobic membrane cloth. The resulting toner cake was then reslurried into about 0.5 to about 1 liter of deionized water, stirred for 30 minutes, then filtered again. The solution conductivity of the filtrate was measured to be about 30 microsiemens per centimeter, which indicated that the washing procedure was sufficient. (Typically, when the filtrate conductivity was measured to be less than or equal to 50 microsiemens per centimeter, the washing/filtering procedures were terminated.) The surface-treated toner cake was redispersed into 200 milliliters of deionized water, and freeze-dried over 48 hours. The final dry yield of chemically DMDODA-Br treated toner (VF114) was measured to be 36 grams. The dry toner had glass transition temperatures of 54.1° C. (onset), 58.8° C. (midpoint), and 63.5° C. (offset).

EXAMPLE IV

Chemical Surface Treatment of a 6 Micron Cyan Toner with 1 Percent by Weight of Dimethyldioctadecylammonium Bromide (DMDODA-Br) (After Mother Liquor Removal)

A 383 gram portion of the 6 micron cyan toner slurry (after mother liquor removal) prepared in the above Example, which contained 10.4 percent toner solids, or 40 grams of toner, was subjected to chemical surface treatment with dimethyldioctadecylammonium bromide (DMDODA-Br) at a concentration of 1 percent by weight of toner solids. The amount of DMDODA-Br salt for 1 percent surface treatment was 0.4 gram, which was delivered as a 0.25 percent (wt/wt) solution of DMDODA-bromide in deionized water. The DMDODA-Br aqueous solution was prepared by mixing 0.4 gram of DMDODA-bromide into 160 millimeters of deionized water (DIW) and heating to 50° C. to aid dissolution. Once dissolved, the DMDODA solution was cooled to about 40° C. A sample of toner slurry containing 40 grams of cyan 6 micron toner solids in 343 grams of water was charged into a 1 liter resin kettle and was mechanically stirred at 285 rpm and heated to 40° C. at a heating rate of about 0.75° C./minute. Once at 40° C., the DMDODA-Br aqueous solution was added dropwise to the toner slurry at an approximate rate of 1 milliliter per minute. After complete addition, the mixture continued stirring for an extra two hours while cooling to ambient temperature. The cooled surface-treated toner slurry was first sieved through a 25 micron stainless steel screen (#500 mesh), and then filtered through a 3 micron hydrophobic membrane cloth. The resulting toner cake was then reslurried into about 0.5 to about 1 liter of deionized water, stirred for 30 minutes, then filtered again. The solution conductivity of the filtrate was measured to be about 30 microsiemens per centimeter, which indicated that the washing procedure was sufficient. (Typically, when the filtrate conductivity was measured to be less than or equal to 50 microsiemens per centimeter, the washing/filtering procedures were terminated.) The surface-treated toner cake was redispersed into 200 milliliters of deionized water, and freeze dried over 48 hours. The final dry yield of chemically DMDODA-Br treated toner (VF115) was measured to be 35 grams. The dry toner had glass transition temperatures of 54.4° C. (onset), 59.3° C. (midpoint), and 64.1° C. (offset).

EXAMPLE V

Chemical Surface Treatment of a 6 Micron Cyan Toner with 1 Percent by Weight of Dimethyldioctadecylammonium Chloride (DMDODA-Cl) (After Mother Liquor Removal)

A 468 gram portion of the 6 micron cyan toner slurry (after mother liquor removal) prepared in the above Example, which contained 10.7 percent toner solids, or 50 grams of toner, was subjected to chemical surface treatment with dimethyldioctadecyl ammonium chloride (DMDODA-Cl) at a concentration of 1 percent by weight of toner solids. The amount of DMDODA-Cl salt for 1 percent surface treatment was 0.5 gram, which was delivered as a 0.25 percent (wt/wt) solution of DMDODA-chloride in deionized water. The DMDODA-Cl aqueous solution was prepared by mixing 0.5 gram of DMDODA-chloride into 200 millimeters of deionized water (DIW) and heating to 50° C. to aid dissolution. Once dissolved, the DMDODA solution was cooled to about 40° C. A sample of toner slurry containing 50 grams of 6 micron cyan toner solids in 418 grams of water was charged into a 1 liter resin kettle and was mechanically stirred at 285 rpm and heated to 40° C. at a heating rate of about 0.75° C./minute. Once at 40° C., the DMDODA-Cl aqueous solution was added dropwise to the toner slurry at an approximate rate of 1 milliliter per minute. After complete addition, the mixture continued stirring for an extra two hours while cooling to ambient temperature. The cooled surface-treated toner slurry was first sieved through a 25 micron stainless steel screen (#500 mesh), and then filtered through a 3 micron hydrophobic membrane cloth. The resulting toner cake was then reslurried into 0.5 to 1 liter of deionized water, stirred for 30 minutes, then filtered again. The solution conductivity of the filtrate was measured to be about 30 microsiemens per centimeter, which indicated that the washing procedure was sufficient. (Typically, when the filtrate conductivity was measured to be less than or equal to 50 microsiemens per centimeter, the washing/filtering procedures were terminated.) The surface-treated toner cake was redispersed into 300 milliliters of deionized water, and freeze dried over 48 hours. The final dry yield of chemically DMDOA-Cl treated toner (VF128) was measured to be 42.7 grams. The dry toner had glass transition temperatures of 53.6° C. (onset), 57.8° C. (midpoint), and 62.1° C. (offset).

EXAMPLE VI

A 10.5 Micron Cyan Toner Comprised of a Linear Sulfonated Polyester Core Resin and Pigment Blue 15:3™ Colorant Aggregated with 1 Percent by Weight of Dimethyldioctadecylammonium Chloride (DMDODA-Cl)

In a glass 2 liter resin kettle equipped with a TEFLON® coated 4 bladed 90° pitched turbine propeller and a 0.5 centimeter diameter thermal probe, and with heating supplied by an electric heating mantle, were added 952.7 grams of the above generated polyester emulsion, and 8.4 grams of Flexiverse Blue 15:3™ color pigment dispersion by Sun Chemical Company. The emulsion was preheated to 60° C. and the rpm ranged from about 180 to about 185. Aggregation was initiated using 5 percent weight zinc acetate s solution to a total of 8 percent weight of resin. The first 6 percent weight zinc acetate relative to resin was added in the first 17 minutes to activate aggregation, the 2 percent more was added between 90 and 100 minutes. At this point the particles were just under 2 μm. The addition of DMDODA- Cl as the main coagulate was added at a concentration of 0.25 percent weight to a total of 1 percent weight of resin. The addition of DMDODA-Cl was initiated at 157 minutes, at an approximate flow rate of 1 milliliter/minute/100 grams of resin. At this point the particles grew faster and to 10.5 μm; GSD=1.5, in about 4.5 hours. The particles were cooled to ambient temperature and discharged and screened through 150 μm and 25 μm sieves to remove coarse material. The particles were then rinsed and washed two times testing the filtrates for conductivity. The final conductivity was 26.4 μS/cm. The filtercake was then resuspended to approximately 25 percent-weight solids and freeze dried (VF130) to yield the toner product comprised of the above resin and colorant.

EXAMPLE VII

A 7.5 Micron Cyan Toner Comprised of a Linear Sulfonated Polyester Core Resin and Pigment Blue 15:3™ Colorant Aggregated with 1 Percent by Weight of Dimethyldioctadecylammonium Chloride (DMDODA-Cl)

In a glass 2 liter resin kettle equipped with a TEFLON® coated 4 bladed 90° pitched turbine propeller and a 0.5 centimeter diameter thermal probe, and with heating supplied by an electric heating mantle, were added 833 grams of the polyester emulsion (SPE-3), and 8.85 grams of FLEXIVERSE BLUE 15:3™ color pigment dispersion by Sun Chemical Company. The emulsion was preheated to 60° C. and the rpm was set at 215. Aggregation was initiated using 5 percent weight zinc acetate solution to a total of 8 percent weight of resin. All the zinc acetate relative to resin was added in the first 30 to 40 minutes to activate aggregation. At this point the particles were around 3 μm. The addition of DMDODA-Cl as the main coagulate was added at a concentration of 0.25 percent weight to a total of 1 percent weight of resin. The addition of DMDODA-Cl was started at 140 minutes, at a approximate flow rate of 1 milliliter/minute/100 grams of resin. At this point the particles grew a lot faster to 7.5 μm; GSD=1.4, in about 4.5 hours. The resulting toner particles were cooled to ambient temperature and discharged, and screened through 150 μm and 25 μm sieves to remove coarse material. The particles were then rinsed and washed three times testing the filtrates for conductivity. The final toner conductivity was 8.17 μS/cm. The filtercake was then resuspended to approximately 25 percent-weight solids and freeze dried (VF143).

Triboelectric Charging Properties

Developers were prepared by mixing each of the above toners with a 65 micron Hoaganese steel core coated with 1 percent by weight of a composite of a polymer of PMMA (polymethylmethacrylate with the conductive carbon black, CONDUCTEX SC ULTRA®, dispersed therein, about 20 weight percent) and conditioned overnight (about 18 hours) at 20 percent and 80 percent RH and charged for 30 minutes on a roll mill. For 5 to 6 micron toners, the toner concentration was 4 percent by weight of carrier. Triboelectric charge was measured by the known Faraday Cage blow-off technique. The toners generated with the CCA coagulant complex agent exhibited improved charge levels at both the 20 percent RH and 80 percent RH, thereby causing the RH sensitivity (the ratio of charge level at 20 percent RH versus 80 percent RH) to drop significantly when compared to the untreated toner.

TABLE I

Tribocharging Results With and Without DMDODA

| Toner ID | Process Used | q,m (μC/g) C-zone (20 Percent RH) | q,m (μC/g) A-zone (80 Percent RH) | RH Ratio |
|---|---|---|---|---|
| Comparative Example Pilot Plant (VF107B) | Zinc acetate only, no surface treatment | −203.8 | −5.4 | 37.7 |
| Example II (VF114) | Post-A/C surface treatment; 1 percent DMDODA-Br (in ML) | −137.9 | −32.1 | 4.3 |
| Example III (VF115) | Post-A/C surface treatment; 1 percent DMDODA-Br (after ML removal) | −142.9 | −35.3 | 4.0 |
| Example IV (VF128) | Post-A/C surface treatment; 1 percent DMDODA-Cl (after ML removal) | −201.7 | −50.4 | 4.0 |
| Example V (VF130) | 1 percent DMDODA-Cl-coagulant and CCA | −100.7 | −32.3 | 3.1 |
| Example VI (VF143) | 1 percent DMDODA-Cl-coagulant and CCA | −76.2 | −21.4 | 3.6 |

ML = mother liquor

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A toner process comprising
   (i) admixing an emulsion latex, a colorant, and a tetra-alkylated quaternary ammonium halide salt complexing agent;
   (ii) wherein the colorant contains from about 20 to about 50 percent of predispersed colorant in water and which colorant possesses a mean colorant size of from about 50 to about 150 nanometers;
   (iii) heating the resulting mixture at a temperature of from about 45° C. to about 65° C. thereby causing aggregation and enabling coalescence, resulting in toner particles of from about 2 to about 25 microns in volume average diameter; and optionally
   (iv) cooling the toner product mixture followed by isolation of said toner.

2. A process in accordance with claim 1 wherein the tetra-alkylated quaternary ammonium halide salt complexing agent is benzyldimethylstearyl ammonium chloride, dimethyldistearyl ammonium halide, acetate, phosphate, sulfate, or alkylsulfonate salts of tetra-alkylated ammonium compounds.

3. A process in accordance with claim 1 wherein the particle size distribution of the aggregated particles formed in (iii) is about 1.40, decreasing to about 1.15 when the temperature is increased from room temperature, about 25° C. to about 55° C.

4. A process in accordance with claim 1 wherein the latex contains a polyester of poly(1,2-propylene-sodio 5-sulfoisophthalate), poly(neopentylene-sodio 5-sulfoisophthalate), poly(diethylene-sodio 5-sulfoisophthalate), copoly-(1,2-propylene-sodio 5-sulfoisophthalate)-copoly-(1,2-propyleneterephthalatephthalate), copoly-(1,2-propylene-diethylenesodio 5-sulfoisophthalate)-copoly-(1,2-propylene-diethylene-terephthalatephthalate), copoly-(ethylene-neopentylene-sodio 5-sulfoisophthalate)-copoly-(ethylene-neopentylene-terephthalate-phthalate), or copoly-(propoxylated bisphenol A)-copoly-(propoxylated bisphenol A-sodio 5-sulfoisophthalate).

5. A process in accordance with claim 1 wherein the complexing agent is selected in an amount of from about 1 to about 5 weight percent.

6. A process in accordance with claim 1 wherein said latex contains a sodio sulfonated polyester resin of a size diameter of from about 10 to about 150 nanometers.

7. A process in accordance with claim 1 wherein said toner is from about 3 to about 10 microns in volume average diameter, and said toner optionally possesses a geometric distribution of less than about, or equal to about 1.25.

8. A process in accordance with claim 1 wherein the addition of said tetra-alkylated quaternary ammonium halide salt complexing agent provides for the aggregation and coalescence of said latex and colorant by primarily destabilizing the resin present in said latex, and wherein said resin is comprised of sulfonated polyester resin colloids and, which addition further provides for particle aggregation between the quaternary ammonium halide, colorant and resin.

9. A process in accordance with claim 1 wherein said latex contains a sulfonated polyester resin destabilized by adding a solution of positively charged tetra-alkylated quaternary ammonium halide salts which are capable of adsorbing onto the negative sulfonated moieties protruding out of the resin.

10. A process in accordance with claim 1 wherein said latex contains a sodio sulfonated polyester.

11. A process in accordance with claim 1 wherein said agent is benzyldimethylstearyl ammonium chloride.

12. A process in accordance with claim 1 wherein said agent is dimethyldistearyl ammonium chloride.

13. A process in accordance with claim 1 wherein said agent is dimethyldioctadecyl ammonium chloride.

14. A process comprising
    (i) admixing an emulsion latex, a colorant, and a tetra-alkylated quaternary ammonium halide salt complexing agent; and thereafter, heating in sequence about below the Tg of a resin contained in said latex and about above the Tg glass transition temperature of a resin contained in said latex.

15. A process in accordance with claim 14 wherein the latex contains a polyester of poly(1,2-propylene-sodio 5-sulfoisophthalate), poly(neopentylene-sodio 5-sulfoisophthalate), poly(diethylene-sodio 5-sulfoisophthalate), copoly-(1,2-propylene-sodio 5-sulfoisophthalate)-copoly-(1,2-propylene-terephthalatephthalate), copoly-(1,2-propylene-diethylenesodio 5-sulfoisophthalate)-copoly-(1,2-propylene-diethylene-terephthalatephthalate), copoly-(ethylene-neopentylene-sodio 5-sulfoisophthalate)-copoly-(ethylene-neopentylene-terephthalate-phthalate), or copoly-(propoxylated bisphenol A)-copoly-(propoxylated bisphenol A-sodio 5-sulfoisophthalate).

16. A process in accordance with claim 14 wherein the colorant is carbon black, magnetite, cyan, yellow, magenta, or mixtures thereof.

17. A process in accordance with claim 14 wherein there results isolated toner particles of from about 2 to about 15 microns in volume average diameter.

18. A process in accordance with claim 14 wherein there is added to the surface product obtained, and which product is a toner metal salts, metal salts of fatty acids, silicas, metal oxides, or mixtures thereof, each in an amount of from about 0.1 to about 10 weight percent of the obtained toner.

19. A process in accordance with claim 14 wherein the product obtained is a toner of from about 3 to about 20 microns in volume average diameter.

20. A process in accordance with claim 14 wherein said first heating is from about 35° C. to about 65° C., and wherein said second heating is from about 40° C. to about 65° C. above the latex resin Tg.

21. A process in accordance with claim 14 wherein there results a toner and wherein said toner is cooled to about 25° C., followed by washing and drying.

22. A process in accordance with claim 14 wherein said tetra-alkylated ammonium compounds contain from 1 to about 20 carbon atoms.

23. A process in accordance with claim 14 wherein said alkyl is methyl, ethyl, propyl, n-butyl, sec-butyl, tert-butyl, n-pentyl, iso-pentyl, neo-pentyl, hexyl, heptyl, octyl, nonyl, decyl, undecyl, dodecyl, lauryl, tridecyl, tetradecyl or myristyl, pentadecyl, hexadecyl or cetyl, heptadecyl, octadecyl, stearyl, or nonadecyl.

24. A process in accordance with claim 14 wherein said agent is dimethyldioctadecyl ammonium chloride.

25. A surfactant free process for the preparation of toner comprising
    admixing an emulsion latex comprised of a sodio sulfonated polyester resin and heating said resin in water at a temperature of from about 15° C. to about 30° C. above the resin glass transition temperature with a colorant dispersion containing from about 20 to about 50 percent of predispersed colorant in water, followed by the addition of a tetra-alkylated quaternary ammonium halide salt complexing component; heating the resulting mixture at a temperature of from about 35° C. to about 65° C.; and
    (v) cooling.

26. A process in accordance with claim 25 wherein there is prepared an emulsion latex comprised of the sodio sulfonated polyester resin particles by heating said resin in water, and wherein subsequent to cooling the toner is isolated, and then dried.

27. A process in accordance with claim 26 wherein said isolated is by filtration and cooling is to about 25° C.

28. A surfactant free process for the preparation of toner comprising mixing an emulsion latex comprised of sodio sulfonated polyester resin particles and a colorant, followed by the addition of a tetra-alkylated quaternary ammonium halide salt complexing agent, and heating the resulting mixture to enable aggregation and coalescence of said resin particles and said colorant.

29. A process in accordance with claim 28 comprising
    (i) preparing an emulsion latex comprised of sodio sulfonated polyester resin particles of from about 5 to about 300 nanometers in size diameter by heating said resin in water at a temperature of from about 65° C. to about 90° C.;
    (ii) adding with shearing to said latex a colorant dispersion containing from about 20 to about 50 percent of a predispersed colorant in water and with a mean colorant size of from about 50 to about 150 nanometers, followed by the addition of a tetra-alkylated quaternary ammonium halide salt complexing agent;
    (iii) heating the resulting mixture at a temperature of from about 45° C. to about 65° C. thereby causing aggregation and enabling coalescence, resulting in toner particles of from about 2 to about 25 microns in volume average diameter; and
    (iv) isolating the toner product.

* * * * *